(12) United States Patent
Humer et al.

(10) Patent No.: US 7,401,852 B2
(45) Date of Patent: Jul. 22, 2008

(54) ACTUATABLE BACK PANEL FOR A VEHICLE SEAT

(75) Inventors: Mladen Humer, West Bloomfield, MI (US); Nagarjun Yetukuri, Rochester Hills, MI (US); Gerald Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 49 days.

(21) Appl. No.: 11/423,044

(22) Filed: Jun. 8, 2006

(65) Prior Publication Data

US 2008/0001447 A1 Jan. 3, 2008

(51) Int. Cl.
*B60N 2/42* (2006.01)
*B60R 21/00* (2006.01)

(52) U.S. Cl. ............... 297/216.13; 297/216.12; 297/216.14; 297/216.1

(58) Field of Classification Search ............ 297/216.12, 297/216.13, 216.14, 216.1
See application file for complete search history.

(56) References Cited

U.S. PATENT DOCUMENTS

| | | | |
|---|---|---|---|
| 3,802,737 A | | 4/1974 | Mertens |
| 4,335,918 A | | 6/1982 | Cunningham |
| 4,491,365 A | | 1/1985 | Murakami |
| 5,884,968 A | * | 3/1999 | Massara ............ 297/216.12 |
| 5,927,804 A | * | 7/1999 | Cuevas ............ 297/216.12 |
| 6,022,074 A | | 2/2000 | Swedenklef |
| 6,033,018 A | | 3/2000 | Fohl |
| 6,135,561 A | * | 10/2000 | Kruger et al. ............ 297/408 |
| 6,199,947 B1 | | 3/2001 | Wiklund |
| 6,213,549 B1 | * | 4/2001 | Wieclawski ............ 297/216.13 |
| 6,523,892 B1 | | 2/2003 | Kage et al. |
| 6,604,788 B1 | | 8/2003 | Humer |
| 6,702,377 B2 | * | 3/2004 | Nakano ............ 297/216.12 |
| 6,938,953 B2 | | 9/2005 | Haland et al. |
| 6,983,996 B2 | * | 1/2006 | Svantesson ............ 297/408 |
| 7,222,915 B2 | * | 5/2007 | Philippot et al. ....... 297/216.13 |
| 2004/0195873 A1 | * | 10/2004 | Saberan et al. ......... 297/216.13 |
| 2006/0006709 A1 | * | 1/2006 | Uno et al. ............ 297/216.12 |
| 2006/0255632 A1 | * | 11/2006 | Sugimoto ............ 297/216.12 |
| 2006/0273636 A1 | * | 12/2006 | Sugimoto ............ 297/216.12 |

FOREIGN PATENT DOCUMENTS

| | | |
|---|---|---|
| DE | 19850758 | 5/2000 |
| DE | 10114385 | 10/2002 |
| EP | 1 714 827 | 6/2007 |

OTHER PUBLICATIONS

Combined Search and Examination Report for GB0711009.1, dated Sep. 28, 2007.

* cited by examiner

*Primary Examiner*—Sarah B McPartlin
(74) *Attorney, Agent, or Firm*—Brooks Kushman P.C.

(57) ABSTRACT

A vehicle seat having a seat back including an actuatable back panel. The back panel of the seat back may be moved between a normal, or flush position, and an actuated, or spaced position, relative to the seat back assembly. The back panel is provided with clips that may be used to connect the back panel to the vehicle seat assembly or suspension. The back panel is actuated in the event of a rear end collision to provide added clearance for operation of an active head restraint system. Seat accessories, such as an adjustable lumbar system or heating/cooling system may be secured to the back panel as a sub-assembly to facilitate manufacture.

18 Claims, 4 Drawing Sheets

ACTUATABLE BACK PANEL FOR A VEHICLE SEAT

BACKGROUND OF THE INVENTION

1. Field of the Invention

The present invention relates to a vehicle seat that has a back panel that is movable relative to the seat between a position in which the back panel is flush mounted to the seat and a position in which the back panel is spaced relative to the seat.

2. Background Art

Vehicle seats are relatively complex structures including a combination of sub-systems that may be used to position the seat, provide heating and cooling, provide an adjustable lumbar support, in addition to providing a comfortable seating area for occupants. First and foremost, vehicle seats must provide a safe and comfortable seating area. The size of a vehicle seat must be limited to maximize vehicle interior space. For enhanced safety, vehicle seats may be provided with passive or active head restraints that are partially received within the interior of a vehicle seat. Other sub-systems, such as an adjustable lumbar support, heating system, cooling system, or position adjustment systems may also be required to be accommodated, in the whole or in part, within the body of a vehicle seat. Accommodating all of these elements in a vehicle seat presents substantial packaging problems in the design of the vehicle seat.

Active head restraints may be of different types. One type of active head restraint has a pivoting linkage that is actuated by the penetration of a person's torso into the seat that engages the linkage and, in turn, pivots the head restraint forwardly and also upwardly to reduce the travel of the seat occupant's head in the event of a collision. These types of linkages require clearance to properly function. The amount of clearance may be limited by the shape and position of the back panel of the seat. In particular, the upper link and head restraint armature may be required to move rearwardly depending upon the structure of the linkage. Rearward movement of the linkage may necessitate increased seat back depth to avoid contact with the seat back panel. Providing increased seat back depth runs counter to the need to provide maximum leg room for rear seat passengers.

Assembly of additional systems into a seat back becomes more complicated when more systems are included. Lumbar systems and heating/cooling systems may be attached to the seat frame by specialized brackets that increase the cost of the seat assembly and also complicate the assembly process. Such systems take up space within the seat and reduce the space available for movement of an active head restraint linkage. Assembly is further complicated by requirements that lumbar supports and temperature modification systems are normally designed to prevent non-functional movement of such systems. Non-functional movement of such systems may cause unwanted noise and vibration and may adversely impact performance of the systems.

Seat back panels are normally sculpted to maximize the leg room available for rear seat passengers. Recesses in the back panel further limit the space available for movement of the active head restraint. Back panels are normally tightly secured to a seat with conventional fasteners, such as screws or clip-type connectors. Depending upon design features and constraints, the back panel of a vehicle seat may either be a relatively rigid molded member or may be formed by a fabric, leather or other flexible web that may be stretched across a frame or otherwise secured to the seat back.

There is a need for a vehicle seat having a seat back that provides ample clearance for the operation of active head restraint linkages, provides added support for seat components, and also facilitates assembly of other seating accessories within the seat.

SUMMARY OF THE INVENTION

According to one aspect of the present invention, a vehicle seat having a seat back is provided. The seat back includes a seat back frame and a seat back cushion secured to the seat back frame that faces in a forward direction. The seat back cushion is supported by the seat back frame. A back panel that faces in a rearward direction is secured by at least one clip to the seat back frame. The clip secures the back panel flush to the seat back in a normal position and secures the back panel in a spaced relationship relative to the seat back in an actuated position. The back panel may be moved from the normal position to the actuated position by a force applied to the seat in a collision.

According to another aspect of the present invention, a vehicle seat is provided that has a seat back for supporting the back of a seat occupant. An active head restraint and an actuating linkage for moving the head restraint from a normal position to an actuated position is also provided as part of the seat back. The active head restraint and actuating linkage are attached to the seat back support assembly. A cushion is secured to the seat back support assembly and a suspension assembly is provided for supporting the cushion relative to the seat back support assembly. A back panel is provided as part of the seat back support assembly that is movable between a flush position in which the back panel is secured flush to the other parts of the seat back support assembly and a spaced position in which the back panel is retained in a spaced relationship relative to the other parts of the seat back support assembly. A plurality of clips extend from a B-side of the back panel and engage the actuating linkage of the active head restraint. Movement of the linkage is transferred to the back panel by the clips to move the back panel from the flush position to the spaced position. Alternatively, the vehicle seat back may be provided with a plurality of clips extending from the B-side of the back panel that engage the seat back frame wherein movement of the suspension is transferred to the back panel by the clips to move the back panel from the flush position to the spaced position.

According to other aspects of the invention, the seat back may further comprise an active head restraint supported by the seat back frame. The active head restraint has a linkage that is moved in the event of a collision through the location where the back panel is disposed in a normal position. The linkage is permitted to move toward the location of the back panel in the actuated position. The clip may be attached to the linkage and moved with the linkage between the normal and actuated positions. The active head restraint may be supported on the linkage to be moved forward and upward in the event of a rear end collision. The active head restraint is actuated by a lower link that is engaged by a torso of a seat occupant as it penetrates into the seat. The lower link may rotate to engage an upper link that actuates an armature of the head restraint wherein the lower link actuates the clip to shift the back panel from the normal position to the actuated position.

According to other aspects of the present invention, the seat back may further comprise a lumbar support assembly, and a thermal conditioning system, such as a heating or cooling system, that is secured to the back panel. Other types of systems that may be assembled to a seat back may include a massage system, side bolster adjustment systems, upper foam adjustment mechanisms, power head restraint adjustment mechanisms, wiring, and other electronic modules.

According to other aspects of the invention, a plurality of clips may be provided that secure the back panel to the seat frame and provide at least one guide for controlling movement of the back panel. The clips may have a full insertion stop that is engaged when the back panel is in the normal position and an extended stop that is engaged when the back panel is in the actuated position.

According to other aspects of the invention, the back panel may be either a solid shell or may include a flexible sheet that forms part of a trim assembly. The seat back may further comprise a suspension wire assembly that supports the seat back cushion and the clips. Alternatively, the seat back frame may further comprise an actuation wire that is connected to an active head restraint assembly on an upper end of the actuation wire and is attached to the seat back frame on the lower end of the actuation wire. The back panel may be sculpted with an A surface that is recessed into the back rest.

These and other aspects of the present invention will be better understood in view of the attached drawings and following detailed description of the illustrated embodiments of the invention.

DETAILED DESCRIPTION OF THE PREFERRED EMBODIMENT(S)

Figure 1:
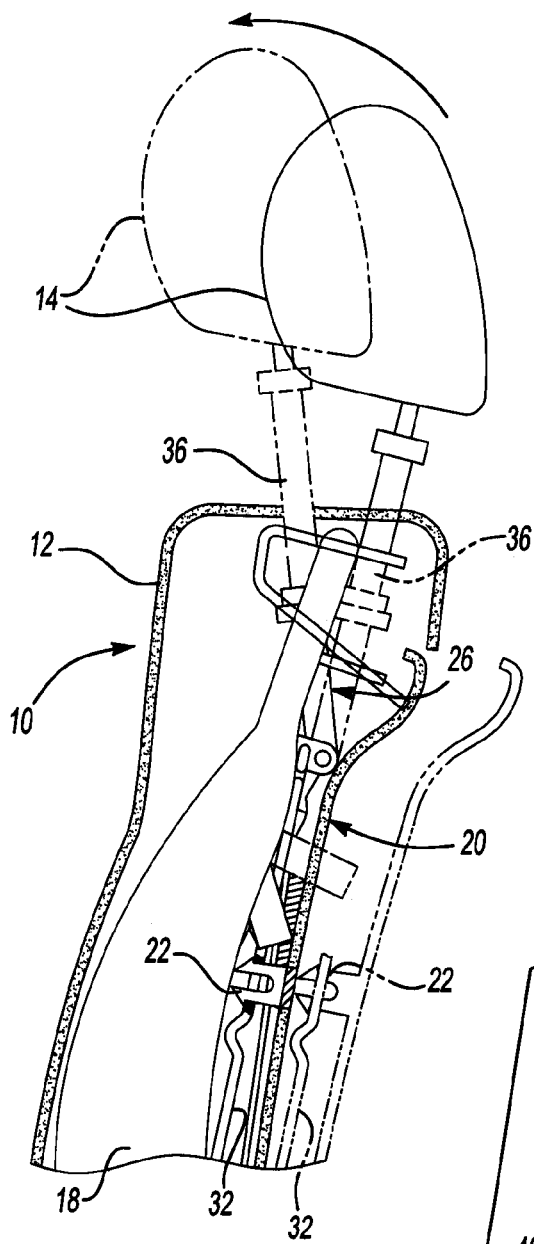
FIG. 1 is a partial cross-section of a vehicle seat made according to the present invention and including an active head restraint system.

Referring to FIG. 1, a vehicle seat is generally indicated by reference numeral 10 of which the seat back 12, or back rest, is diagrammatically indicated. The vehicle seat 10 includes a head restraint pad 14 that is moveable in a collision to provide support for an occupant's head in the event of a rear end collision. In the event of a rear end collision, the head restraint pad 14 is moved from the position shown in solid lines in FIG. 1 upwardly and forwardly to the position shown in phantom lines to provide support for the occupant's head and to reduce the travel of the occupant's head. A seat back cushion 18 is provided within the seat back 12. A back panel 20 is shown in a flush position in solid lines and in a spaced position in phantom lines where it is spaced from the seat back 12.

Clips 22 are provided on the back panel 20 to secure the back panel 20 to the seat back 12. The clips 22 may be either secured to the back panel 20 or formed integrally with the back panel preferably in a molding process in which the clips 22 are molded with the back panel 20.

An active head restraint linkage 26 includes a lower link 30 that is intended to be initially engaged by a seat occupant's pelvis in the event of a rear end collision. The lower link 30 moves rearwardly in response to a force applied by the occupant's pelvis. The lower link 30 is connected on its upper end to an coupler link 32 that is, in turn, connected to an upper link 34. Upper link 34 is connected to an armature 36 that supports the head restraint pad 14. In the event of rear end collision, the lower link 30 is moved rearwardly by the force applied by the pelvis, the coupler link 32 is acted upon by the lumbar, and upper link 34 is acted upon by the shoulders of a seat occupant. These forces applied by a seat occupant's torso assist in rotating and moving the head restraint pad 14 from the use position shown in solid lines in FIG. 1 to the actuated position shown in phantom lines.

Figures 5, 6:
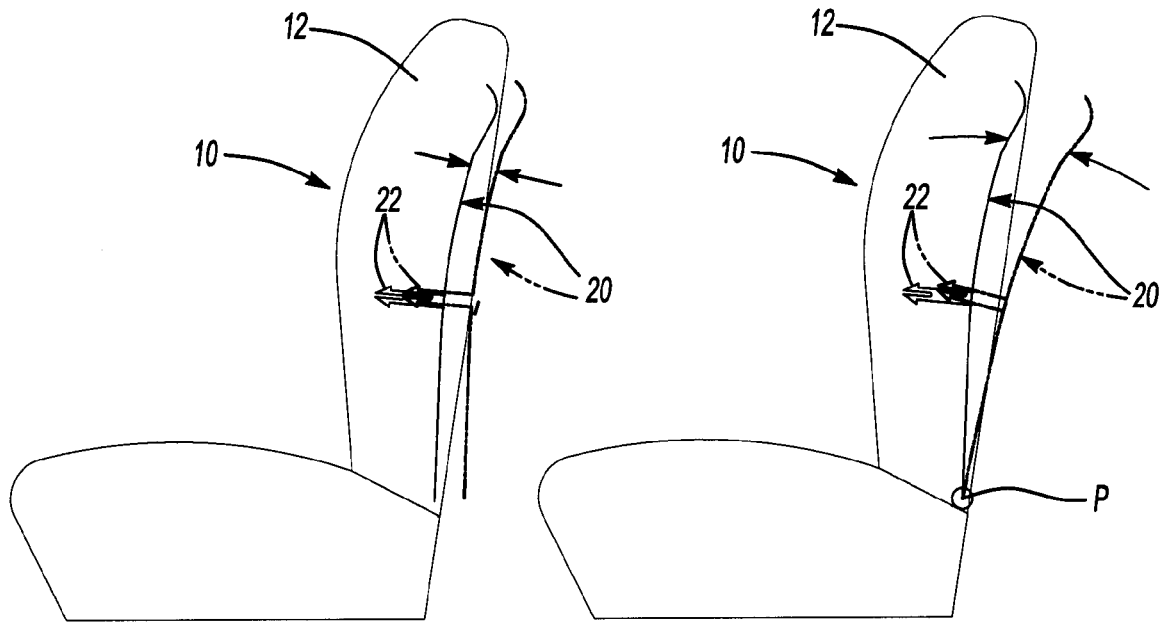
FIG. 5 is a diagrammatic representation of an embodiment of a vehicle seat having a seat back that is secured by the clips to the seat back for sliding movement as guided by the clips.
FIG. 6 is a diagrammatic representation of an alternative embodiment of a vehicle seat having a seat back that is pivotally mounted to the seat on a lower edge.

In the use position, the seat back may be considered to be flush with the portions of the seat against which the back panel is received. The term "flush" as used herein refers to the perimeter of the back panel being held to the seat with minimal spacing therebetween. In the actuated position, the back panel 20 may be spaced from the portions of the seat that it contacts, or abuts, in the use position. As shown in FIG. 5, the back panel 20 may move in a sliding or translating motion so that it is spaced from the other parts of the seat back 12 around the entire periphery or around only part of the periphery of the back panel 20. Alternatively, the back panel 20 could be pivoted about a pivot mount, or hinge, that would result in one edge of the back panel being spaced from the seat with the opposite edge being retained close to the seat. As described below with reference to FIGS. 6-8, the back panel may be hinged in the middle, on the top edge, or on the bottom edge depending upon the portion of the seat that requires increased clearance in the event of a collision.

Figure 2:
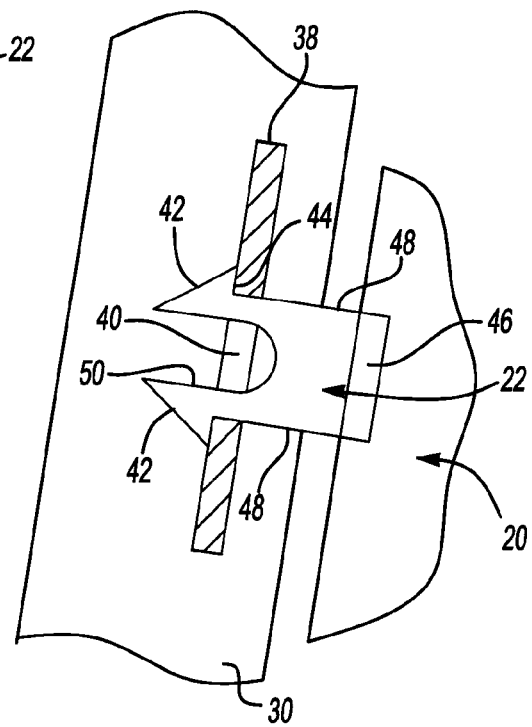
FIG. 2 is a fragmentary perspective view of a clip and a receptacle for the clip with a link of the active head restraint system and back panel of the seat.

Referring to FIG. 2, one of the clips 22 is shown in conjunction with a flange 38 that may be secured to the active head restraint linkage 26. Several clips 22 will most likely be used to secure the back panel 20 to one or more of the lower link 30, coupler link 32, or upper link 34. The flange 38 includes a slot 40 in which the distal end of the clip 22 is received. The clips 22 have convergent edges 42 that are formed at the distal end of the clip 22. A shoulder 44, or extended stop, is defined by the broad portion of the convergent edges 42 to provide a an extended stop for the back panel 20 when the back panel is in its spaced position. An end flange 46, or full insertion stop, may be formed as a flange of the clip or may be formed by the surface of the back panel 20 at the point on the back panel 20 from which the clip 22 extends that is engaged when the back panel 20 moves from the normal position to the actuated position. The upper and lower edges of the clip 22 form guide edges 48 that guide movement of the clip 22 during assembly relative to the slot 40 in the flange 38. The back panel 20 is moved between its use position and actuated position by the movement of the linkage 26. A relief slot 50 is provided in the clip 22 that permits the convergent edges 42 of the clip 22 to move together as they initially pass through the slot 40 in the flange 38.

Figure 3:
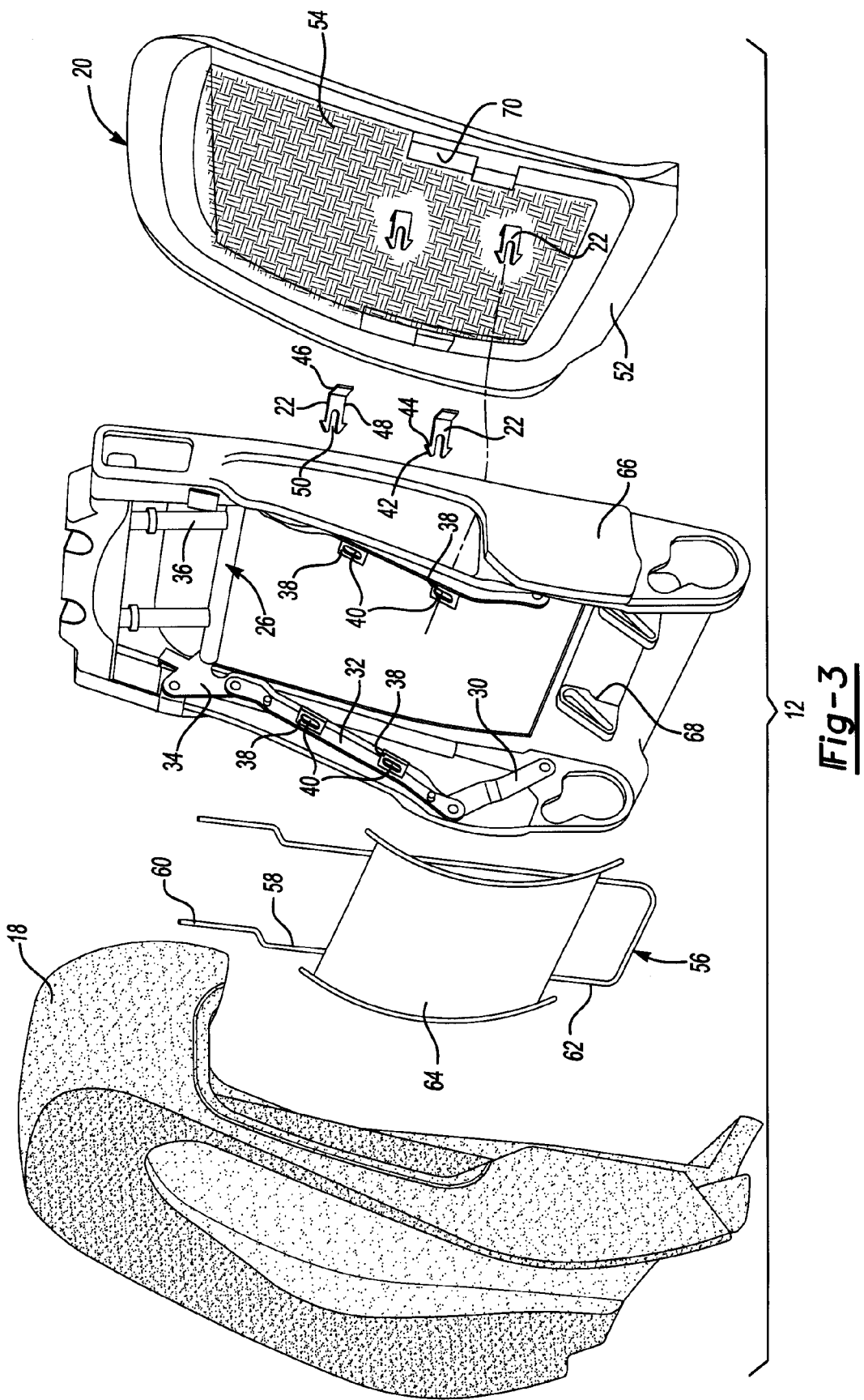
FIG. 3 is an exploded perspective view of one embodiment of a vehicle seat back that includes an actuatable back panel, an active head restraint and a lumbar support.

Referring to FIG. 3, the seat back 12 is shown in exploded perspective to include the seat back cushion 18. A suspension wire assembly 56 supports the seat back cushion 18. The suspension wire assembly 56 includes an actuation wire 58 that may be used in actuating the active head restraint linkage 26. An upper end 60 of the actuation wire is received by the active head restraint linkage 26. A lower end 62 of the actuation wire secures the suspension wire assembly 56 to the seat back frame 66. A lumbar support assembly 64 is shown secured to the suspension wire assembly 56. A seat back frame 66, or seat back support assembly, provides the frame for the seat back 12. A suspension wire guide 68 is provided on the seat back frame 66 and receives the lower end 62 of the actuation wire 58. The guide 68 facilitates movement of the suspension wire 56 during a collision event.

Four clips 22 are shown in FIG. 3 that are secured to the b-side 70 of the trim assembly 52. While the use of four clips 22 is illustrated, any number of clips could be used as required by the particular seat structure. The clips 22 are assembled to the back panel 20 and extend in a forward direction to be received in the slots 40 formed on the flanges 38. The flanges 38 are attached to the coupler link 32 so that when the coupler link 32 is moved in the event of a collision the flanges 38 drive the clips 22 by engaging the end flange 46 of the clips 22 or by engaging the back panel 20. This causes the back panel 20 to move from its flush position to its spaced position in which it is spaced from the seat back 12. Instead of engaging the end flange 46, a detent could be provided on the guide edges 48 to be engaged by the flanges 38. Movement of the back panel is stopped by the shoulders 44, or extended stops, so that the back panel 20 is permitted to move away from the vehicle seat to a limited extent and is guided by the guide edges 48.

An efficient load path is provided by attaching the clips 22 to the active head restraint mechanism 26. The occupant's torso applies a load in the following sequence first to the seat foam 18, then to the suspension wire assembly 56, then to back panel 20, then to the clips 22 and then to the active head restraint 26. This load path may be supplemental to directly loading the active head restraint through the suspension. If the clips 22 are attached to the active head restraint mechanism 26, the back panel 20 can be moved rearward during impact and may automatically return to the original, or flush, position after the impact.

Additional conventional fasteners (not shown) could also be used to secure the back panel 20 to the seat back 12. If used, such conventional fasteners could be frangible, or breakable, or may be received in a releasable manner to avoid interference with operation of the clips 22.

The back panel 20, as illustrated in FIG. 3, includes a trim assembly 52 that forms a frame for flexible sheet 54 that provides the rear surface of the back panel 20. The flexible sheet 54 may be any type of upholstery fabric such as cloth, vinyl, or leather. The flexible sheet 54 could also be mounted on a pivot and could also include pleated side panels that open when the back panel 20 is moved to its actuated position.

Figure 4:
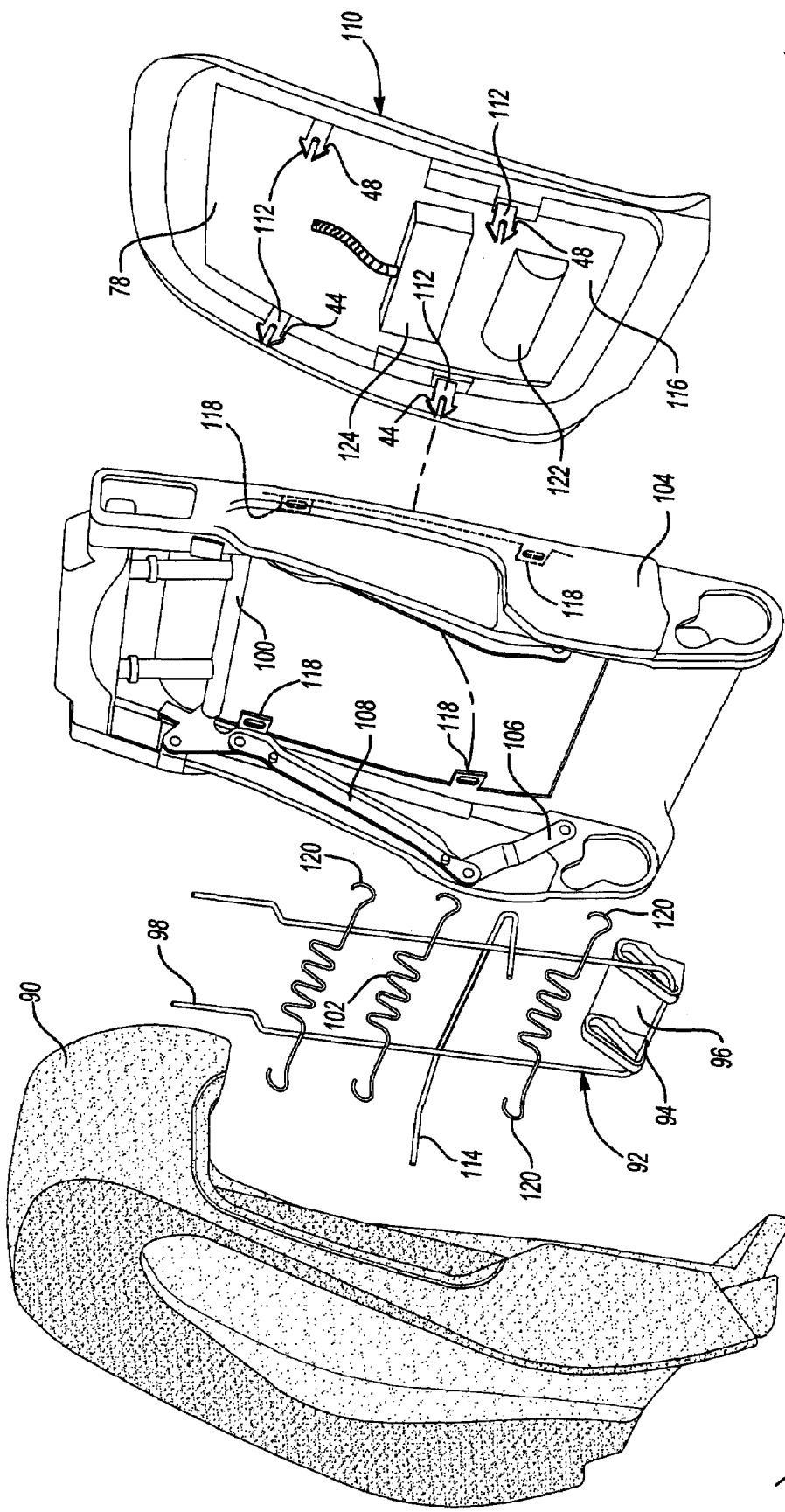
FIG. 4 is an exploded perspective view of another embodiment of a vehicle seat back having an actuatable back panel that is secured to the seat frame.

Referring to FIG. 4, an alternative embodiment is shown to include the seat back cushion 90 and suspension wire assembly 92. The suspension wire assembly 92 is secured on its lower end 94 in a suspension wire guide 96. The suspension wire includes an upper end 98 that is received by the active head restraint system 108. A plurality of suspension springs 102 extend across the suspension wire assembly 92 to provide additional support for the seat back cushion 90. The cushion 90 and suspension wire assembly 92 are assembled to the seat back frame 104 and may also be supported by other support wires 114. As an alternative, the suspension wire assembly 92 could be attached to the back panel 110. The seat back frame 104 also provides support for the lower link 106 and coupler link 108 of the active head restraint system 100.

In the embodiment shown in FIG. 4, the back panel 110 is formed as a solid shell of relatively rigid plastic. It should also be understood that the back panel could be of a different construction. One example of an alternative construction of a back panel could be a structural framework or skeleton that is secured to the frame, active head rest linkage, or suspension over which the fabric of the seat cover material is later secured. Integral clips 112 may be formed as part of the back panel 110 to extend from the b-side 116 of the back panel 110. The integral clips 112 are received in receptacles 118 that are secured to the seat back frame 104. Hooks 120 on the suspension wire assembly 92 may be attached to either the coupler link 108 or the back panel 110.

In the event of a rear end collision, the penetration of an occupant's body into the seat back cushion 90 causes the suspension to flex rearwardly driving the back panel 110 from the flush position to the spaced position to provide clearance for actuation of the head restraint system 100. Movement of the back panel 110 is guided on the guide edges 48, as previously described with reference to FIG. 2. The movement of the back panel 110 is stopped by the shoulders 44, also as described with reference to FIG. 2, that are formed on the clips 112. If the clips 112 are secured to the seat back frame 104, it may be necessary to manually reset the back panel 110 after impact to the original position.

A lumbar support assembly 122 and thermal conditioning system 124 are shown secured to the back panel 110. Assembly of the vehicle seat 10 is facilitated by using the rigid molded back panel 110 to support the lumbar support assembly 122 and thermal conditioning system 124. Fewer brackets may be required with this approach as compared to seat structures that attach the accessory systems to the seat back frame 104. Other accessory systems that may be assembled to the back panel 110 may include seat element adjustment mechanisms, massage systems, head restraint adjustment systems, or the like.

The clips 22 that secure the back panel 20 may be either reusable or designed for one-time use. Reusable clips 22 would be designed to be pushed back in place from the actuated position to the use position. This would reduce the cost of repairing or servicing the seat 12 after a collision. The reusable clips 22 could be manually reset or automatically reset. Alternatively, one-time use clips 22 could be designed to be easily replaced after actuation.

Referring to FIG. 5, a vehicle seat 10 having a detachable back panel 20 is diagrammatically illustrated. The back panel 20 is separable from the seat back 14 to a limited extent as a result of forces applied to the seat back 14. The back panel may slide or shift as guided by the clips 22. Clips 22 limit the extent of movement of the back panel 20 and prevent the back panel 20 from being completely separated from the seat back 14.

In FIG. 6, a vehicle seat 10 having a pivotable back panel 20 is shown. The pivotable back panel 20 pivots about the pivot point P that may be provided by a hinge or other pivot connection. In FIG. 6, the pivot point P is located at the lower edge of the back panel 20 and secures the lower edge of the back panel 20 to seat back 12. Clips 22 limit and guide movement of the top portion of the seat back panel 20 as it moves toward the actuated position shown.

Figures 7, 8:
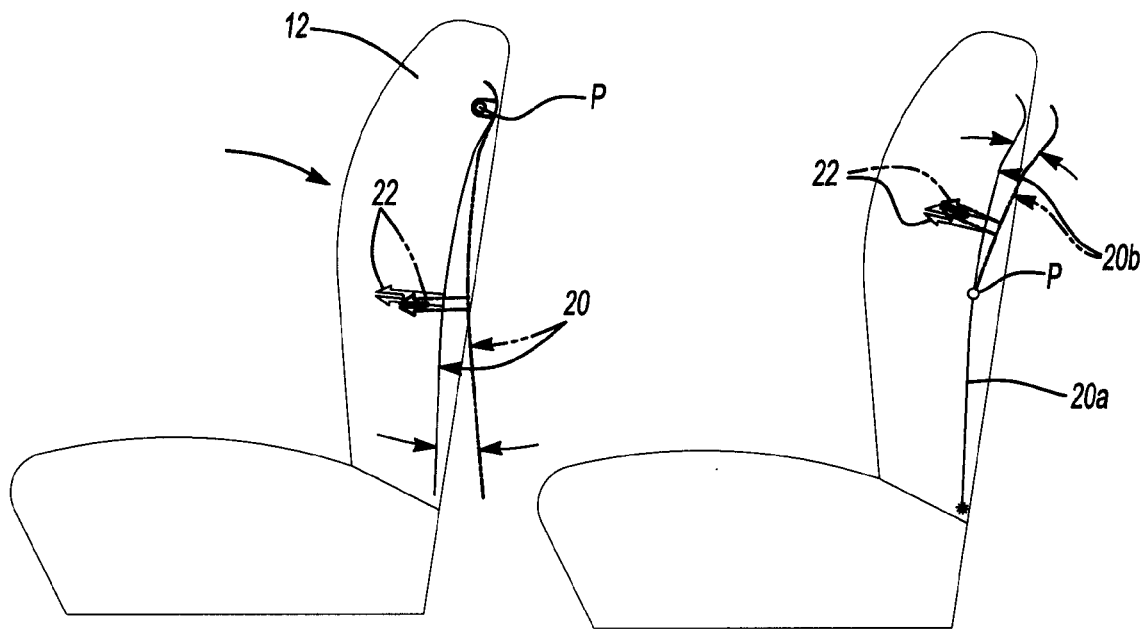
FIG. 7 is a diagrammatic representation of an alternative embodiment of a vehicle seat having a seat back that is pivotally mounted to the seat on an upper edge.
FIG. 8 is a diagrammatic representation of an alternative embodiment of a vehicle seat having a seat back that is pivotally mounted to the seat on a pivot located at an intermediate position on the seat back panel.

Referring to FIG. 7, another alternative embodiment of a vehicle seat 10 is shown wherein a back panel 20 is secured at a pivot point P to the seat back 12. The pivot point may be a hinge or another type of pivot connection that may be located on a bottom edge of the back panel 20. The back panel 20 is moved between its use position and actuated position. As the back panel is moved, it is guided by the clips and the extent of movement is limited as previously discussed.

Referring to FIG. 8, another alternative embodiment is provided wherein a pivot point P is provided at an intermediate location on a back panel that is divided into a lower portion 20a and an upper portion 20b. As shown in FIG. 8, the pivot point P may be provided by a hinge or pivot connection that may be used to allow either the upper portion 20b to pivot between the use position and actuated position shown. Alternatively, the pivot P could be used to allow the lower portion 20a to pivot between a use position and actuated position. In FIG. 8, the lower portion 20a is shown in its use position, but could be moved in a manner similar to the movement shown with regard to the upper portion 20b. Clips 22 are provided, as shown, to guide and limit the extent of movement of the back panel upper portion 20b.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

That is claimed is:

1. A seat back for a vehicle seat comprising:
   a seat back frame;
   a seat back cushion secured to the seat back frame and facing in a forward direction, the seat back cushion being supported by the seat back frame;
   an active head restraint supported by the seat back frame;
   a back panel secured in a normal position relative to the seat back frame and facing in a rearward direction; and
   at least one clip attaching the back panel to the seat, the clip securing the back panel flush to the seat back in the normal position and the clip securing the back panel in a spaced relationship relative to the seat back in an actuated position, wherein the back panel may be moved from the normal position to the actuated position by a force applied to the seat in a collision, wherein the clip has a full insertion stop that is engaged when the back panel moves from the normal position to the actuated position and an extended stop that is engaged when the back panel is in the actuated position.

2. The seat back of claim 1 wherein the active head restraint is supported by a linkage that is moved in the event of a collision through the location where the back panel is disposed in the normal position and toward the location of the seat back panel in the actuated position.

3. The seat back of claim 2 wherein the clip is attached to the linkage and is moved with the linkage between the normal and actuated positions.

4. The seat back of claim 2 wherein the active head restraint is supported on the linkage to be moved forward and upward in the event of a rear end collision and wherein the active head restraint is actuated by a seat occupant's torso as it penetrates into the seat and engages the linkage.

5. The seat back of claim 4 wherein the linkage includes a lower link that rotates a coupler link and an upper link to actuate an armature of the head restraint and wherein the linkage also engages the back panel to shift the back panel from the normal position to the actuated position.

6. The seat back of claim 1 further comprising a lumbar support assembly that is secured to the back panel.

7. The seat back of claim 1 further comprising a thermal conditioning system that is secured to the back panel.

8. The seat back of claim 1 further comprising a pivot connection between the back panel and the seat back that permits one side of the back panel to move away from the seat back.

9. The seat back of claim 1 wherein the clip has one or more guides formed thereon that control the movement of the back panel as the back panel moves from the normal position to the actuated position.

10. The seat back of claim 1 wherein the back panel is a solid shell.

11. The seat back of claim 1 wherein the back panel includes a flexible sheet that forms part of a trim assembly.

12. The seat back frame of claim 1 further comprising an actuation wire that is connected to an active head restraint assembly on an upper end of the actuation wire and is attached to the seat back frame on a lower end of the actuation wire.

13. A vehicle seat having a back rest for supporting the back of a seat occupant, the backrest comprising:
   a seat back support assembly;
   an active head restraint and an actuating linkage for moving the head restraint from a normal position to an actuated position, the active head restraint and the actuating linkage being attached to the seat back support assembly, wherein a flange is provided on the linkage;
   a cushion attached to the seat back support assembly;
   a suspension supporting the cushion relative to the seat back support assembly;
   a back panel that is movable between a flush position in which the back panel is secured flush to the seat back support assembly and a spaced position in which the back panel is retained in a spaced relationship relative to the seat back support panel;
   a plurality of clips extend between a back side of the back panel and the actuating linkage, wherein the clips have upper and lower edges that guide the movement of the back panel relative to a slot in the flange provided on the linkage as the back panel moves between the flush position and the spaced position, wherein movement of the linkage is transferred to the back panel to move the back panel from the flush position to the spaced position.

14. The vehicle seat of claim 13 wherein a seat accessory is attached to the back panel.

15. The vehicle seat of claim 13 wherein the back panel is moved to the spaced position to provide clearance for movement of the actuating linkage when the head restraint is moved from the normal position to the actuated position.

16. A vehicle seat having a back rest for supporting the back of a seat occupant, the backrest comprising:
   a seat back support assembly;
   an active head restraint and an actuating linkage for moving the head restraint from a normal position to an actuated position, the active head restraint and the actuating linkage being attached to the seat back support assembly;
   a cushion attached to the seat back support assembly;
   a suspension supporting the cushion relative to the seat back support assembly;
   a back panel that is movable between a flush position in which the back panel is secured flush to the seat back support assembly and a spaced position in which the back panel is retained in a spaced relationship relative to the seat back support panel;
   a plurality of clips extend between a back side of the back panel and the seat back support assembly, wherein the clips have a full insertion stop that is engaged when the back panel moves from the flush position to the spaced position guide portions that control the back panel movement between the flush position and the spaced position, and an extended stop that is engaged when the back panel is in the spaced position, wherein forces applied by an occupant in a collision move the back panel from the flush position to the spaced position.

17. The seat back of claim 16 wherein the clips are integrally formed with the back panel.

18. The seat back of claim 16 wherein the clips are attached to the back panel.

* * * * *